United States Patent [19]
Gehring

[11] Patent Number: 5,316,394
[45] Date of Patent: May 31, 1994

[54] RADIAL ROLLER BEARING

[75] Inventor: Rudolf Gehring, Neukirch-Egnach, Switzerland

[73] Assignee: Hydrel AG, Romanshorn, Switzerland

[21] Appl. No.: 836,003

[22] PCT Filed: Jun. 24, 1991

[86] PCT No.: PCT/CH91/00138
§ 371 Date: Feb. 26, 1992
§ 102(e) Date: Feb. 26, 1992

[87] PCT Pub. No.: WO92/00463
PCT Pub. Date: Jan. 9, 1992

[30] Foreign Application Priority Data
Jun. 27, 1990 [CH] Switzerland .............. 2136/90-9

[51] Int. Cl.$^5$ .............................................. F16C 33/46
[52] U.S. Cl. ..................................... 384/574; 384/524
[58] Field of Search ............ 384/572, 524, 574, 579, 384/526

[56] References Cited

U.S. PATENT DOCUMENTS
1,699,325  1/1929  Dake ................................. 384/524
2,983,559  5/1961  Blinder .............................. 384/524

FOREIGN PATENT DOCUMENTS
0170017  2/1986  European Pat. Off. .
3418621  11/1985  Fed. Rep. of Germany .
584717  2/1925  France .
1261047  4/1961  France .

Primary Examiner—Lenard A. Footland
Attorney, Agent, or Firm—Blum Kaplan

[57] ABSTRACT

The radial roller bearing has an outer ring (1), an inner ring (2), several roller members (3), and a cage (4). The cage (4) is guided on the edges (1a) of the outer ring (1) via several supporting rollers (5) distributed around the circumference in the form, for example, of ball bearings. This makes it possible to avoid sliding friction for guiding the cage (4) and to guide the cage without any clearance, so that the roller bearing can attain a high limit speed.

24 Claims, 6 Drawing Sheets

RADIAL ROLLER BEARING

The invention relates to a radial roller bearing with a cage for separating and, depending on the design, for guiding the roller members. In the known radial roller bearings of this type, the cage, for its part, is usually aligned in sliding surfaces belonging to the other roller elements, mostly on the roller members or on the rim or edge of the inner or outer ring, in some cases in a roller member ring between the cage and one of the rings of the roller bearing. If a radial roller bearing is not equipped with edges, e.g. as in needle bearings, then the cage is guided by the appropriate surfaces of the connection components.

In most applications, such roller bearings are lubricated with grease, in most other cases with oil, and in a few extreme cases with solid lubricants, some of which are applied to the bearing components as coatings. Grease is the preferred lubricant most of the time because it is easy to use and the least expensive. However, grease lubricants do not conduct heat, which is why roller bearings having high circumferential speeds are lubricated with oil. The oil required for cooling, however, causes a higher working action in the roller bearing, which, in turn, results in higher bearing temperatures. In roller bearings that require a lower temperature in spite of the high revolutions, e.g. in tooling machines, extensive procedures are used to separate the lubrication and cooling processes. Thereby, the lubrication occurs via a precisely measured and continuous supply of a minimum amount of oil, whereas the cooling is carried out by the oil's transport air flow.

When the heat resulting therefrom is conducted independent from the lubricant, i.e. via air or external water cooling, special greases make it possible to attain the same high speeds as in oil-lubricated roller bearings. Especially when grease is used as a lubricant, the attainable revolutions are limited by the fact that proper lubrication of the sliding contacts of the cages is no longer assured which, in turn, causes too much friction heat, which often leads to the destruction of the roller bearing. For this reason, numerous special cage materials and coatings are used to reduce the friction at these sliding points. Although such measures are capable of increasing the limit speed of a roller bearing, they do not suffice for many applications.

DE-PS 45681 and FR-PS 584-717 describe roller bearings in which the cages are aligned through roller member rings between the cage and one of the rings. Although this serves to avoid the sliding friction, the roller member ring, for its part, requires a cage, which is forcibly unstable and thus subject to oscillation. In addition, there is the danger that due to their low load the roller members of the guiding roller bearing are not driven. This results in sliding effects with very high heat and rapid destruction of the roller bearing. Furthermore, these roller member rings are also very sensitive to dimensional changes in the various components of the roller bearing resulting from temperature fluctuations that forcibly occur in roller bearings attaining high speeds. For this reason, it is also not possible to manufacture these roller member rings without clearance or even with a preload against the inner or outer race, because in actual operating conditions this would cause the roller bearing to overheat and seize.

That is why the embodiments of the two aforesaid patents did not succeed in practice.

In the case of oil- or grease-lubricated roller bearings, cage oscillations are another phenomenon that limits the maximum attainable bearing revolutions.

Therefore, it is the object of the invention to create a roller bearing of the type described at the onset which avoids the disadvantages of current embodiments, thus making possible, in particular, higher circumferential speeds using grease or oil lubricants, or which results in lower bearing temperatures under the same operating conditions. According to the invention, this objective is attained by the fact that the cage of the roller bearing is aligned by several small ball bearings that are distributed around its circumference and preferably formed as ball-mounted supporting rollers. Preferably, these bearings are pre-loaded to eliminate the guide clearance of the cage, but they do exhibit an inner bearing clearance.

In the following, embodiments of the invention are explained on the basis of the drawings.

BRIEF DESCRIPTION OF THE DRAWINGS:

FIGS. 5 and 6 show one additional variation each of the embodiment according to FIGS. 1 through 4;

Figure 1:
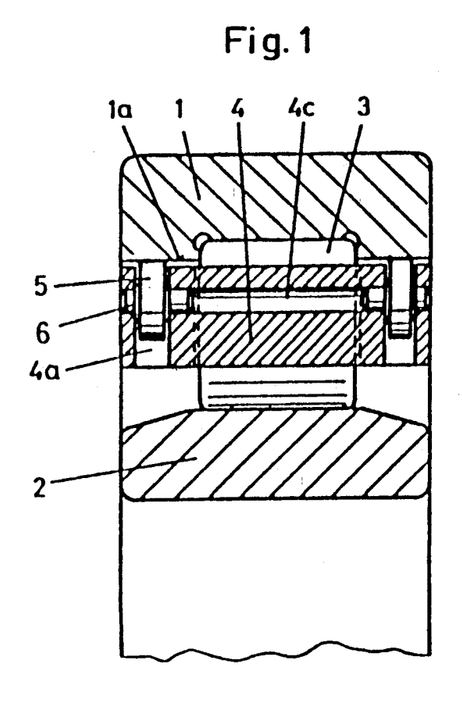
FIGS. 1 and 2 show the axial and radial cross-sections of a first embodiment.
Figure 1A:
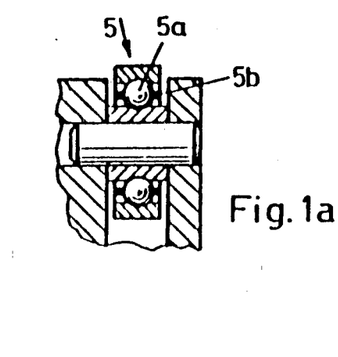
FIG. 1a shows detail of a supporting roller.
Figure 2:
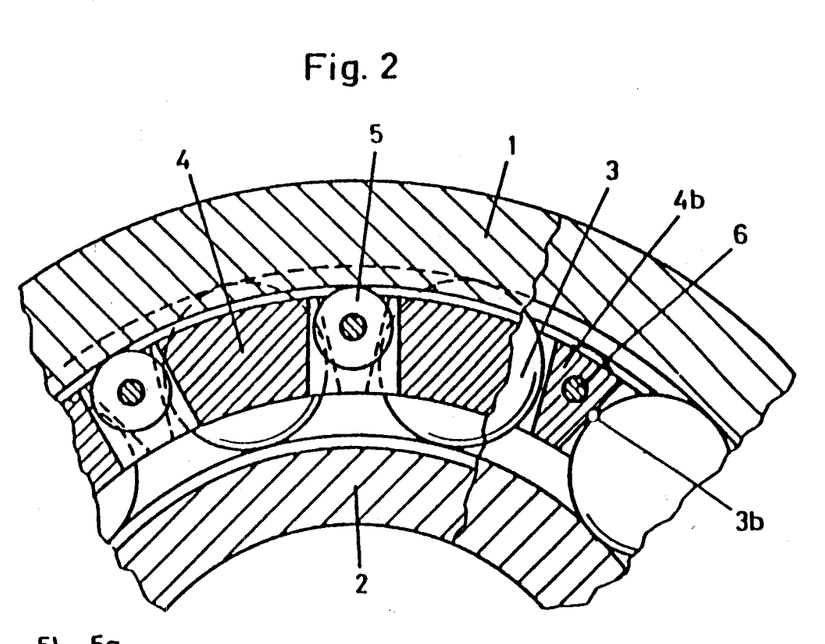

FIGS. 1 and 2, there is a part of a roller bearing as shown. It consists of an outer ring (or outer race) 1 and an inner ring (or inner race) 2 and several roller members 3, as well as a cage 4 for separating and/or guiding roller members 3. The outer ring 1 on both sides has an edge 1a with a cylindrical inner surface. Holes 4c that are parallel to the axis are drilled into at least three of the circumferentially spaced ridges 4b of the cage 4 that separate the roller members 3. Radial slits 4a are cut into the cage 4 at the bore locations 4c adjacent to the two front surfaces. Ball bearings are inserted into these slits 4a in the form of supporting rollers 5 and are aligned by pins 6 that are pressed into the holes 4c. The supporting rollers roll on the cylindrical inner surface of the ring edges 1a. That is how the cage 4 is aligned by rolling contact. The supporting rollers 5, in turn, which are formed as ball bearings, are equipped with cages 5b. The sliding velocity of these supporting roller cages 5b, however, is only one half of that attained by bearing cage 4. In addition, the supporting rollers 5 are only slightly loaded and have small dimensions. For this reason, they can be equipped with roller members, preferably balls 5a made of special materials, which in terms of lubrication requirements are much more advantageous than those belonging to the primary roller bearing. These small roller bearings that align the cage are thus suitable for applications with extremely high revolutions.

In small roller bearings, e.g. with shaft diameters less than 50 mm, the roller bearing of the supporting roller is extremely small. In such a case, it is also possible to guide the outer ring of the supporting rollers with the help of a small sliding roller on pin 6. In this case, too, the sliding velocity at the sliding contact is only a fraction of that which occurs in normal roller bearings between the cage and its guiding surfaces. The decisive roller alignment of the cage is not changed thereby. The roller bearing according to the invention has the additional advantage that the thermal load to which cage 4 is subjected is substantially lower than in current roller bearings thanks to the fact that it is mounted on a roller bearing anti-friction raceway. This is why cage materials exhibiting high heat expansion coefficients and outer edge alignment are also suitable.

Figure 3:
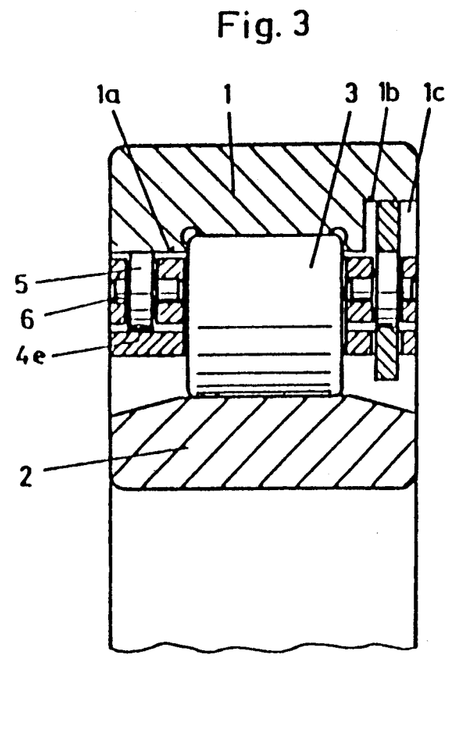
FIGS. 3 and 4 show a variation of the embodiment according to FIGS. 1 and 2.
Figure 4:
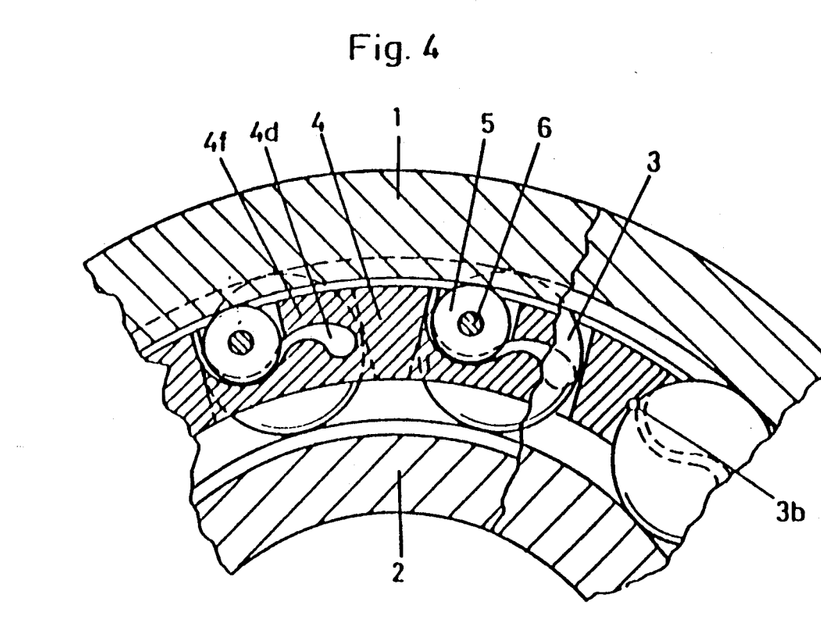

Especially good conditions are obtained when the supporting rollers 5 are mounted on springs, thus guiding the cage in edges 1a without any clearance whatsoever. The spring characteristic can be selected as desired and optimally adjusted to the application at hand. This largely avoids cage oscillations, and the limit speed can be further increased. Such a solution is shown in the variation according to FIGS. 3 and 4. Here, suitably formed slits 4d serve to form spring arms 4f from the cage cheek 4e; pins 6 for the supporting rollers 5 are pressed into the spring arms. The drawing to the right side of FIG. 3 shows another variation based on the same principle, wherein the diameter of the aligning surface 1b, however, is enlarged via a recess 1c. This makes it possible to include larger supporting rollers 5, thus reducing their revolutionary speed. For reasons related both to manufacturing and use, the circumferential diameter of the supporting roller, however, is at the most approximately one third of the external diameter of the cage. The smaller revolutionary speed of the supporting rollers reduces the dynamic stress to which its ball bearings 5a are subjected.

Another possible embodiment of this principle consists of making the cage so flexible that the latter acts as a contact pressure spring as it is mounted with a small deformation. The contact pressure spring is shown in connection with additional embodiments in FIG. 6. This variation is suited especially for applications in which there are only three supporting rollers 5 per side and when the cage materials used have a low elasticity module, e.g. in cages made of synthetic materials. In addition, such cages exhibit the important advantage of having a very low weight and thus smaller mass forces.

Apart from static forces resulting from the elasticity, additional dynamical forces occur in function of the centrifugal acceleration of the inner bearing ring and pins 6 in all embodiments having circumferential supporting rollers to guide the cage. In the case of very high revolutionary speed these additional forces can subject the roller bearing to extremely high stress. The embodiments shown in FIGS. 5 and 6 are suited for such applications.

The embodiment shown in FIG. 5 is characterized by at least 3 supporting rollers 5 that are mounted via pins 6 in one rocker 14 each. The rocker 14, for its part, swivels on bolt 16 and carries on its other end an equalization weight 17. The supporting roller 5 is pressed to the guiding surface 1b of the outer ring 1 via spring 15 and the rocker 14. When the roller bearing is turning, additional centrifugal forces act on the rocker 14 in function of the mass forces of bolt 6, the inner ring 2, and the equalization weight 17. The equalization weight 17 should be selected in such a manner that it automatically adjusts the optimal stress to which the supporting roller 5 is subjected in any operating condition. A damping element 18 can be used to further reduce oscillations.

Figure 6:
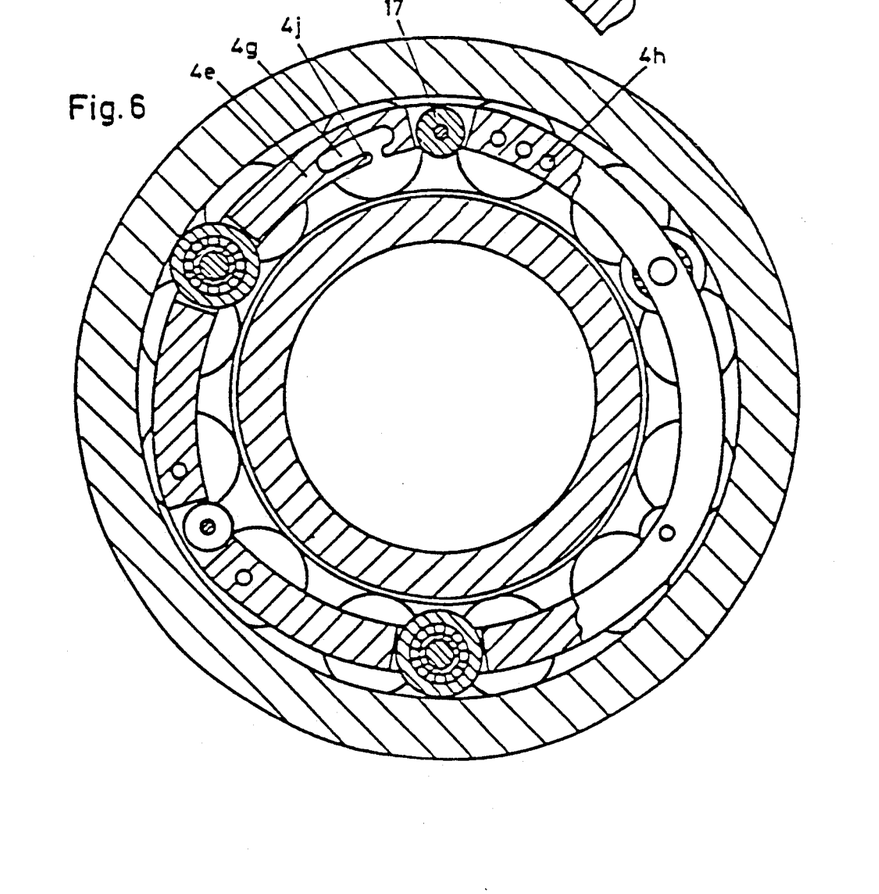

The principle relating to the equalization weight is used on a cage in the embodiment according to FIG. 6, wherein the elasticity of the cage preloads the supporting rollers. The initially round cage 4 assumes a polygon shape as a result of the action of the supporting rollers 5. Equalization weights 17 are mounted on cage 4 between the supporting rollers 5. The equalization weight exerts stress on the cage and attempts to deform it as a result of the centrifugal force that occurs when the roller bearing is turning. This compensates for the effect of the centrifugal force, which the inner ring of the supporting rollers and the pins 6 exert on the cage 4. The supporting roller 5 is thus optimally loaded regardless of the speed.

Cages having this design are usually made of synthetic material exhibiting a high degree of self-damping capacity, so that in this embodiment the cage itself does not oscillate.

Special applications, e.g. those with very high temperatures, require metal cages with a low self-damping characteristic. In such cases, it may be advantageous to design the individual sections of the cage cheek 4e situated between the supporting rollers 5 in different ways and/or to equip them with additional weights. Thus, each section achieves its own natural frequency, which effectively counters the occurrence of the entire cage's auto-oscillation.

This embodiment is shown in FIG. 6 with recesses 4g and holes 4h. Tongue 4j forms an additional independent oscillation system, which further reduces auto-oscillations of the cage as a result of disruptions.

Figure 7:
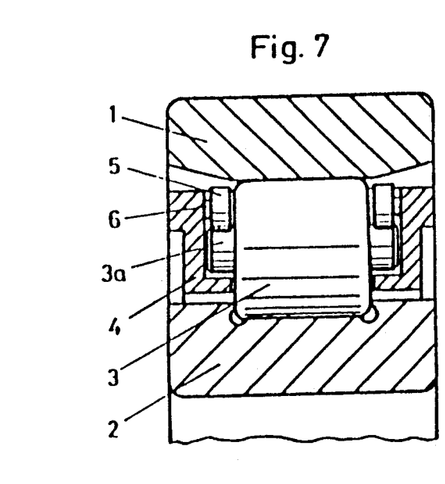
FIGS. 7, 8, and 9 show the axial and radial cross-sections, as well as a view from above, of a second embodiment.
Figure 8:
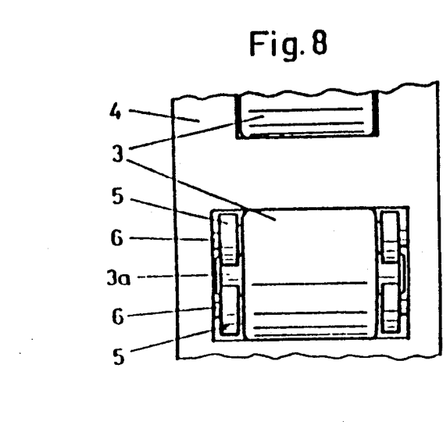
Figure 9:
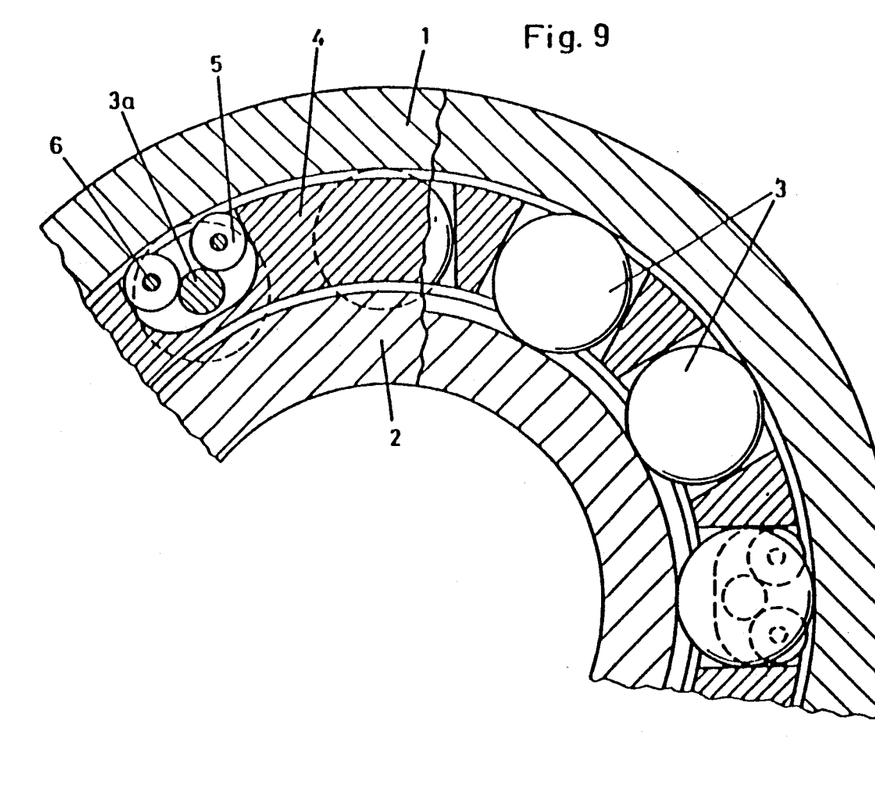

FIGS. 7 through 9 show an additional embodiment of the invention, wherein the cage is aligned on roller members. In this embodiment, three of the roller members 3 are equipped with support pegs 3a. Two supporting rollers 5 each, preferably ball bearings, roll on the cylindrical envelope surface of these pins. The ball bearings are mounted for rotation in cage 4, thus guiding the latter via rolling contact on the cylinder rollers 3.

Analogously, the sliding friction at points 3b between the roller members 3 and the cage 4 can be eliminated (FIG. 2) in cages guided on rollers which roll on the edges 1a of a bearing ring. Experience has shown, however, that thanks to the provision of lubricant through the revolving roller member, this sliding point permits much higher speeds than the sliding contact of a regular cage in the guiding edge. Therefore, a rolling contact at this point is not advocated for edge-guided cages for economic reasons.

Figure 10:
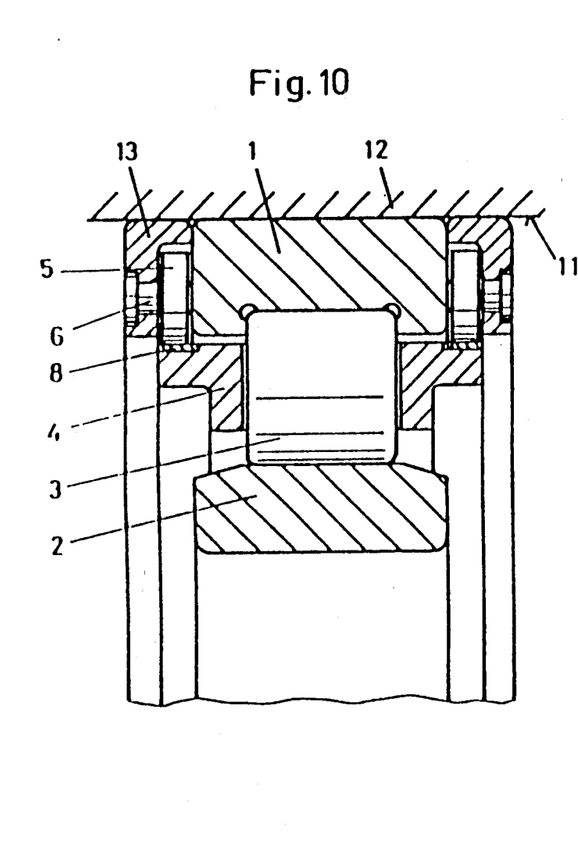
FIGS. 10 and 11 show a third embodiment in the representation according to FIGS. 1 and 2.
Figure 11:
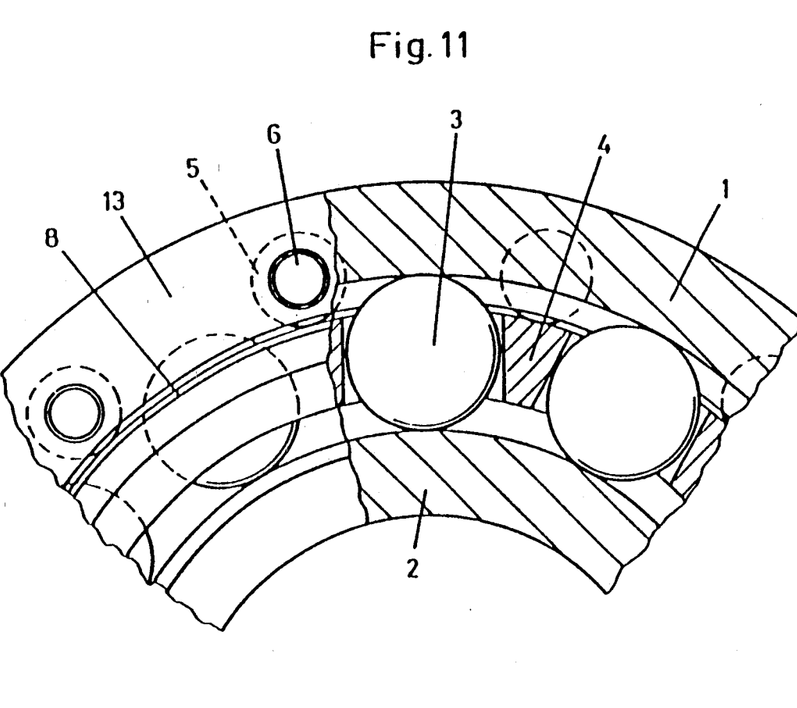

The embodiment according to FIGS. 10 and 11 shows two centered rings 13 on both front surfaces of the outer ring 1 in a cylindrical bore 11 of an element 12, into which an outer ring 1 is inserted. At least three supporting rollers 5 each, which, again, are formed as ball bearings, are rotatably supported on said rings 13. The supporting rollers 5 roll on the bands 8.

In each embodiment discussed herein, cage 4 is guided by the bearing ring. The Figures herein show supporting rollers 5 bearing against outer ring 1. However, this invention can also be practiced with supporting rollers 5 bearing against inner ring 2. Furthermore, the roller bearings within the cage can also operate by bearing against a suitable surface of the connecting structure rather than on the edge of the bearing rings. In general, the guide surfaces for the supporting rollers 5 are represented in cylindrical fashion to conform to standard mass production bearing ring types. However, they can also be cambered, so that the profile of the guide surface in the longitudinal section, for example, conform to a circular or so-called gothic arc.

Figure 12:
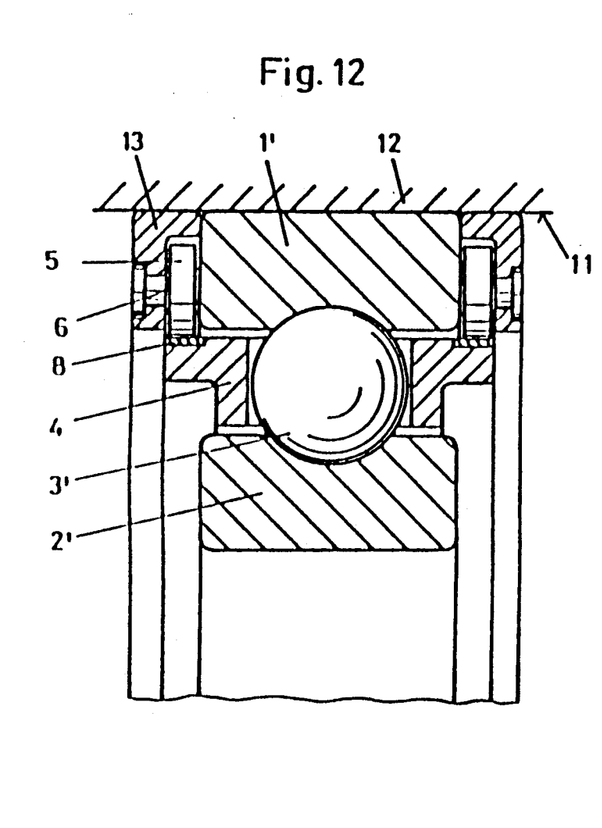
FIGS. 12 and 13 show a fourth embodiment in the representation according to FIGS. 1 and 2.
Figure 13:
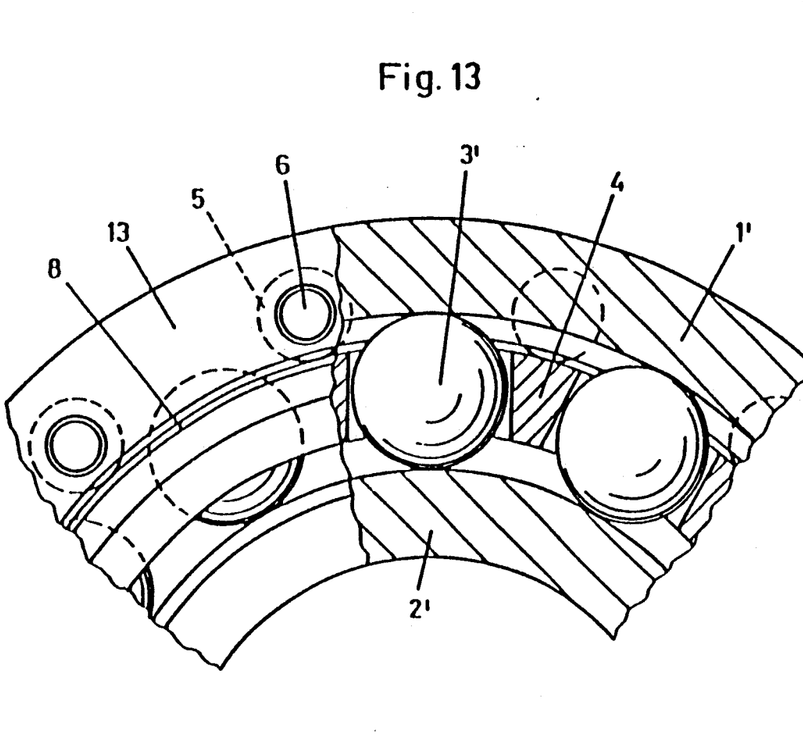

The ball bearing is an important embodiment of the roller bearing according to the invention. The embodiment according to FIGS. 12 and 13 shows a ball bearing with balls 3', two centered rings 13 on both front surfaces of the outer ring 1' in a cylindrical bore 11 of an element 12, into which an outer ring 1' is inserted. At least three supporting rollers 5 each, which, again, are formed as ball bearings, are rotatably supported on said rings 13. The supporting rollers 5 roll on the bands 8.

Finally, it should be noted that the representation of the embodiment according to FIG. 3 is asymmetrical, i.e. with the large supporting roller shown only on the right side, so that several variations could be included in one figure.

I claim:

1. A radial antifriction bearing, comprising:
   an outer member having an inner surface;
   an inner member having an outer surface;
   a cage having a plurality of circumferentially spaced ridges separating a plurality of rolling elements from one another, said rolling elements being mounted within the cage and disposed between the inner member and the outer member, the rolling elements contacting and rolling on the inner surface of the outer member and the outer surface of the inner member; and
   a plurality of supporting rollers and corresponding shafts, each supporting roller being rotatably supported by the respective shaft, said supporting rollers and shafts being disposed about the circumference of the cage for guiding said cage by rolling contact;
   the supporting rollers having an outside diameter less than one-third the outside diameter of the cage.

2. The radial antifriction bearing according to claim 1, wherein at least one of the inner member and the outer member includes a guide surface that is co-axial to the cage and at least three supporting rollers are mounted for rotation in the cage for contacting and rolling on the guide surface.

3. The radial antifriction bearing according to claim 2, including equalization means for adjusting the force of the supporting rollers on the outer member in response to variation in rotational speed of the bearing.

4. The radial antifriction bearing according to claim 3, including one rocker for each supporting roller at one end thereof and an equalization weight at the opposite end of the rocker, the rocker pivoting in the cage for pressing the supporting roller against the guide surface due to centrifugal forces.

5. The radial antifriction bearing according to claim 4, including a damping element mounted between the rocker and the cage.

6. The radial antifriction bearing according to claim 2, wherein the outer member is one of an outer race-ring and a construction element with a cylindrical opening and the inner member is one of an inner race-ring and a shaft guided by the radial antifriction bearing and the at least one guide surface for the supporting rollers is formed on one of the inner surface of the outer member, the outer surface of the inner member, the inner surface of the construction element with the cylindrical opening and the shaft being guided by the antifriction bearing.

7. The radial antifriction bearing according to claim 2, wherein the supporting rollers are supported for rotation by ball bearings.

8. The radial antifriction bearing according to claim 7, wherein the supporting rollers are biased against the guide surface.

9. The radial antifriction bearing according to claim 8, wherein the cage is formed with slits to form spring arms for biasing the supporting rollers against the guide surface.

10. The radial antifriction bearing according to claim 8, wherein the cage is formed of an elastic material for biasing the supporting rollers towards the guide surface.

11. The radial antifriction bearing according to claim 10, including equalization weights mounted on the cage between the supporting rollers whereby centrifugal force caused by the equalization weights exerts pressure on the cage to compensate for the centrifugal forces of part of the supporting rollers.

12. The radial antifriction bearing according to claim 2, wherein the supporting rollers are biased against the guide surface.

13. The radial antifriction bearing according to claim 12, wherein the cage is formed with slits to form spring arms for biasing the supporting roller members against the guide surface.

14. The radial antifriction bearing according to claim 12, wherein the cage is formed of an elastic material for biasing the supporting rollers towards the guide surface.

15. The radial antifriction bearing according to claim 14, including equalization weights mounted on the cage between the supporting rollers whereby centrifugal force caused by the equalization weights exerts pressure on the cage to compensate for the centrifugal forces of part of the supporting rollers.

16. The radial antifriction bearing according to claim 1, wherein the cage includes a coaxial ring-shaped insert made of a harder material than the cage with the supporting rollers rolling on the ring-shaped insert.

17. The radial antifriction bearing according to claim 16, wherein the supporting roller members include ball bearings.

18. The radial antifriction bearing according to claim 1, wherein the rolling elements are rollers and at least three of the rolling elements each include a cylindrical pin extending from each side of the rolling element and on each side of the rolling element at least one supporting roller is rolling on the respective pin and is rotatably supported on the cage.

19. The radial antifriction bearing according to claim 1, wherein the rolling elements are balls.

20. The radial antifriction bearing according to claim 1, wherein the supporting rollers have a cylindrical outer surface.

21. The radial antifriction bearing according to claim 1, wherein the supporting rollers are axially spaced from the rolling elements.

22. The radial antifriction bearing according to claim 1, wherein the number of the supporting rollers is smaller than the number of the rolling elements.

23. The radial antifriction bearing according to claim 22, wherein the number of supporting rollers on either axial side of the cage is three.

24. The radial antifriction bearing for rotation about an outer surface of an inner member and an inner surface of an outer member, comprising:
    a cage having a plurality of circumferentially spaced ridges separating a plurality of rolling elements from one another, the rolling elements being mounted within the cage and disposed between the inner member and the outer member, the rolling elements contacting and rolling on the inner surface of the outer member and the outer surface of the inner member;

a plurality of supporting rollers and corresponding shafts, each supporting roller rotatably supported by the respective shaft, said supporting rollers and shafts disposed about the circumference of the cage for guiding said cage by rolling contact;

the supporting rollers having an outside diameter less than one-third the outside diameter of the cage.

* * * * *